United States Patent
Eberlein

(10) Patent No.: US 10,523,662 B2
(45) Date of Patent: Dec. 31, 2019

(54) IN-MEMORY DATABASE ADVANCED PROGRAMMING MODEL

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 284 days.

(21) Appl. No.: 15/267,873

(22) Filed: Sep. 16, 2016

(65) Prior Publication Data

US 2018/0081668 A1    Mar. 22, 2018

(51) Int. Cl.
*H04L 29/06* (2006.01)
*G06F 8/70* (2018.01)

(52) U.S. Cl.
CPC ............. *H04L 63/083* (2013.01); *G06F 8/70* (2013.01); *H04L 63/0807* (2013.01)

(58) Field of Classification Search
None
See application file for complete search history.

(56) References Cited

U.S. PATENT DOCUMENTS

| | | | |
|---|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,479,187 B2 | 7/2013 | Driesen et al. |

(Continued)

OTHER PUBLICATIONS

U.S. Appl. No. 14/960,983, filed Dec. 7, 2015, Eberlein, et al.
U.S. Appl. No. 15/083,918, filed Mar. 29, 2016, Eberlein, et al.
U.S. Appl. No. 15/087,677, filed Mar. 31, 2016, Eberlein, et al.

*Primary Examiner* — Wei Y Zhen
*Assistant Examiner* — Binh Luu
(74) *Attorney, Agent, or Firm* — Fish & Richardson, P.C.

(57) ABSTRACT

An application is defined including an application implementation and a deployment application including design-time artifacts. Persistence artifacts are modeled as content for the deployment application. Persistence artifacts needed at runtime are generated using implemented software code for the application implementation and the generated persistence artifacts are added to the modeled persistence artifacts. The defined application is added to a multi-tenancy-enabled multi-target application (MTA) associated with the defined application and comprising a set of modules. The MTA is stored into a versioned artifact repository. An MTA deployment service is triggered to deploy the MTA and the application associated with the MTA is started.

17 Claims, 5 Drawing Sheets

(56) References Cited

U.S. PATENT DOCUMENTS

| | | |
|---|---|---|
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,519,701 B2 * | 12/2016 | Amulu ............... G06F 17/30587 |
| 9,665,617 B1 * | 5/2017 | Long .................. G06F 16/9558 |
| 9,724,757 B2 | 8/2017 | Barrett |
| 9,772,835 B1 * | 9/2017 | Trautmann ............... G06F 8/65 |
| 2007/0168384 A1 * | 7/2007 | Fildebrandt ............. G06F 8/34 |
| 2009/0282401 A1 * | 11/2009 | Todorova ................. G06F 8/61 |
| | | 717/175 |
| 2012/0047185 A1 * | 2/2012 | Driesen .................... G06F 8/60 |
| | | 707/803 |
| 2013/0325672 A1 | 12/2013 | Odenheimer et al. |
| 2014/0047319 A1 | 2/2014 | Eberlein |
| 2014/0101099 A1 | 4/2014 | Driesen et al. |
| 2014/0164963 A1 | 6/2014 | Klemenz et al. |
| 2014/0181154 A1 * | 6/2014 | Amulu .................... G06F 16/28 |
| | | 707/803 |
| 2014/0181306 A1 * | 6/2014 | Kothamasu ........... G06F 9/5072 |
| | | 709/226 |
| 2014/0325069 A1 | 10/2014 | Odenheimer et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0149985 A1 * | 5/2015 | Foebel ............. G06F 17/30371 |
| | | 717/131 |
| 2015/0169808 A1 * | 6/2015 | Manley ............... G06F 17/5009 |
| | | 703/21 |
| 2015/0178332 A1 | 6/2015 | Said et al. |
| 2016/0055014 A1 * | 2/2016 | Gallimore ........... G06F 9/44521 |
| | | 719/320 |
| 2016/0266895 A1 * | 9/2016 | Block ....................... G06F 8/70 |
| 2017/0025441 A1 | 1/2017 | Mori |
| 2017/0061338 A1 * | 3/2017 | Mack ................. G06Q 10/0637 |
| 2017/0322782 A1 * | 11/2017 | Pakiman ................... G06F 8/34 |
| 2017/0372247 A1 * | 12/2017 | Tauber ...................... G06F 8/30 |
| 2018/0052861 A1 * | 2/2018 | Seetharaman ........ G06F 3/0482 |
| 2018/0307472 A1 * | 10/2018 | Paul ........................... G06F 8/60 |
| 2018/0331901 A1 * | 11/2018 | George ................... G06N 5/046 |
| 2018/0336027 A1 * | 11/2018 | Narayanan ................ G06F 8/61 |
| 2019/0138287 A1 * | 5/2019 | De Capoa ........... G06F 9/44505 |
| 2019/0196800 A1 * | 6/2019 | Shodhan .................... G06F 8/60 |
| 2019/0258465 A1 * | 8/2019 | De Capoa ................. G06F 8/64 |

* cited by examiner

IN-MEMORY DATABASE ADVANCED PROGRAMMING MODEL

BACKGROUND

While a migrating to a cloud-based computing services supplier, organizations are finding that many customers still prefer a classical model of packaged software delivery and deployment to systems located on-premise. This poses a challenge to application developers as to developing software that is optimized for both a cloud-computing network (and supporting concepts that are only applicable to cloud environment) and remaining deployable and operable in an on-premise environment.

SUMMARY

The present disclosure describes methods and systems, including computer-implemented methods, computer program products, and computer systems for providing an in-memory database advanced programming model.

In an implementation, an application is defined including an application implementation and a deployment application including design-time artifacts. Persistence artifacts are modeled as content for the deployment application. Persistence artifacts needed at runtime are generated using implemented software code for the application implementation and the generated persistence artifacts are added to the modeled persistence artifacts. The defined application is added to a multi-tenancy-enabled multi-target application (MTA) associated with the defined application and comprising a set of modules. The MTA is stored into a versioned artifact repository. An MTA deployment service is triggered to deploy the MTA and the application associated with the MTA is started.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, in code management, code is managed from source repository, to artifact repository, to deployment service to deployment application, to database object created in a persistence container. Second, in an authentication/authorization flow, authentication/authorization is performed from a tenant-specific identify provider, to server (for example, an OAuth server), to mapping of groups to roles, to an Application Router, to functional authorization based on scopes in applications to instance-based authorization in a database. Third, in a design-time/run-time data flow, data flows to a user interface from an application router, from services (for example, OData services) based on core data services (CDS) annotations coming together with the actual data from a deployment infrastructure container. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
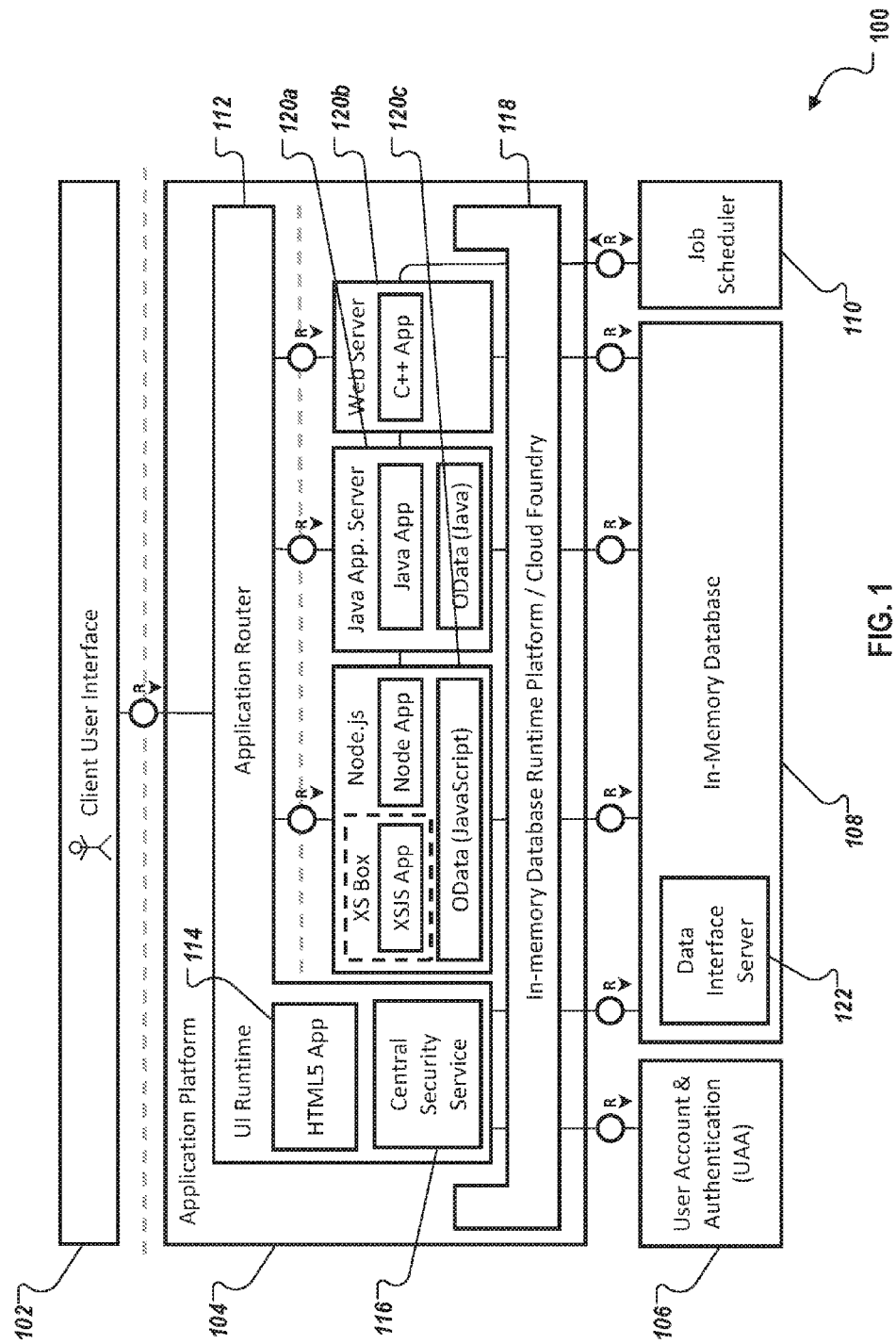
FIG. 1 is a block diagram of a computer-implemented system for providing an in-memory database advanced programming model, according to an implementation.

The following detailed description describes an in-memory database advanced programming model and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

While a migrating to a cloud-based computing services supplier, organizations are finding that many customers still prefer a classical model of packaged software delivery and deployment to systems located on-premise. This poses a challenge to application developers as to developing software that is optimized for both a cloud-computing network (and supporting concepts that are only applicable to cloud environment) and remaining deployable and operable in an on-premise environment. As a result, application developers have needed to build two separate applications, one for on-premise deployment and one for cloud-based deployment. In order to reuse common parts, differences on all levels are abstracted, which complicate development and maintenance of the applications.

The described subject matter describes an advanced programming model providing multiple runtimes (for example, JAVA-type) for programming and enabling an application environment where application developers can focus on solving application problems and deployment to both cloud-based and on-premise systems. The environment is based on a microservices architecture and it is decoupled from an in-memory database, increasing scalability. While the disclosure focuses on use of an in-memory database, in other implementations, conventional, hybrid, or other databases can be used. These other databases are considered to be within the scope of this disclosure.

In an example implementation, an application platform (for example, SAP HANA XSA) can be added to an in-memory database. In a cloud-based computing system, the application platform is typically provided by, for example, CLOUD FOUNDARY or other another application platform. In an on-premise system, a runtime can be bundled with the in-memory database to provide a compatible platform that enables applications to be deployed to both cloud-based and on-premise systems. This configuration does not offer similar richness and elasticity as a full cloud infrastructure, but it is optimized for simple deployment and operation of applications that need both application deployment options.

The described advanced programming model embraces the CLOUD FOUNDARY-type model and leverages its concepts and technologies. In areas where CLOUD FOUNDARY (as an intentionally generic platform for distributed web applications) does not address relevant topics or offers choices, the advanced programming model provides guidance in-line with a general cloud programming model.

The advanced programing model optimizes for 12-Factor applications:
1. Codebase—One codebase tracked in revision control, many deploys,
2. Dependencies—Explicitly declare and isolate dependencies,
3. Configuration—Store configuration in the environment,
4. Backing Services—Treat backing services as attached resources,
5. Build, release, run—Strictly separate build and run stages,
6. Processes—Execute the app as one or more stateless processes,
7. Port binding—Export services via port binding,
8. Concurrency—Scale out via the process model,
9. Disposability—Maximize robustness with fast startup and graceful shutdown,
10. Dev/prod Parity—Keep development, staging, and production as similar as possible,
11. Logs—Treat logs as event streams, and
12. Admin processes—Run admin/management tasks as one-off processes.

In typical example implementations, code bases are stored in an external repository (for example, GIT or other repository). From there, applications are deployed (pushed) to the described platform and run in separate processes that can be scaled independently. Services are exposed using port bindings, configurations stored in the environment, and built upon backing services that are consumed over the network. Advanced programming model applications build upon the microservices paradigm and leverage CLOUD FOUNDARY tools and services to create, bind, and dispose of services.

Three service layers typically balance the need for decoupling versus the cost of network communication:
1. Backing services provide the technology upon which applications are built. They may run in the local infrastructure or consumed over the internet. Some examples for backing services are persistence services (for example, databases, key-value stores, etc.), communication services (for example, message queues, email gateways, etc.) or authentication services (for example, the User Account and Authentication service UAA).
2. Application services implement logic and build upon backing services. They are implemented in different languages (for example, JAVA or JAVASCRIPT) for which the platform provides appropriate runtimes (for example, TOMCAT EE, Node.js, etc.). Communication between application services is always remote as they are running in isolated persistence containers that are managed by the platform infrastructure.
3. Mashup services combine application services and expose central endpoints to the user interface that runs as rich client in the browser. In their most simple form they perform simple URL based routing (as provided by the Application Router or the Fiord Launchpad), but they may as well implement more complex choreography of service calls (for example, as seen in SAP Hybris-as-a-Service (YaaS)).

The component model in a microservice architecture is based on services, where:
Each service has its independent lifecycle and must provide stable service interfaces for robust integration with other services that may be upgraded or even completely replaced at different times,
Services are isolated from each other and share nothing. If common frameworks or libraries need to be shared, they are embedded redundantly (and possible in different versions) in each service,
Services can be implemented in any available language and run on any available runtime, independently on the languages and runtimes other services are implemented in, and
Services can provide extensions to other services, either by wrapping or replacing existing services with extended implementations or implementing pre-defined extension point service interfaces. New applications can be aggregated from existing and new services by combining them in a mashup service.

To ease deployment of groups of services that (in their specific combination constitute an application to be managed as a whole), the advanced programming model introduces the concept of a multi-tenancy enabled multi-target application (MTA) that can be deployed in one step and share the same lifecycle, but otherwise keep their independence. This is an important operational benefit for on-premise delivery that is also supported in the cloud, but depending on the operations model less applicable, for example, if each individual service is run in a development and operations (DevOps)-type model.

FIG. 1 is a block diagram of a computer-implemented system 100 for providing an in-memory database advanced programming model, according to an implementation. At a high-level, the system 100 includes a client user interface (UI) 102 (for example, a browser or other client user interface), application platform 104, user account and authorization (UAA) service 106, in-memory database 108 (for example, SAP HANA or other in-memory database), and a job scheduler 110.

With respect to the client UI 102 and UI model for the advanced programming model, the UI model assumes a rich client UI 102 that can communicate using HTTP with application services in the cloud, for example, using the ODATA protocol for UI5-based user interfaces (where UI5 is a JAVASCRIPT application framework/UI library based on HTML5 designed to build cross-platform applications). For example, an application router 112 component as part of the application platform 104 can provide a UI runtime based on an HTML5 application 114. Note that in this and other implementations, other UI standards can also be implemented for use by, for example, the client UI 102, UI model, and other components of the system 100 (whether or not illustrated).

To overcome the same origin policy restriction of web browsers, the UI client 102 can connect to a central entry point such as the application router 112 or another mashup service that can act as a reverse proxy and route inbound requests to an appropriate application service. Native clients that are not subject to restrictions of web browsers should be configured to follow this model in order to simplify configuration, hide internal implementation details, and to provide a central login/logout point.

In some implementations, applications that are configured to use a device-agnostic UI (for example, using SAP FIORI technology), can be served by a central application router 112 that reads UI content and routing configuration from a shared, layered repository backing service (not illustrated). These applications do not need to deploy using an individual application router 112, but only to deploy their content to the shared, layered repository, backing service. In contrast, plain (non-device-agnostic) UI5 applications can embed their UI content in their own application router 112 that also acts as a web server for content packaged with its own persistence container. These applications do not rely on a backing service as external content repository.

In a typical implementation, in addition to the application router 112, the application platform 104 in-memory database backing service also contains a central security service 116 (within the application router 112), an in-memory database runtime platform/CLOUD FOUNDARY 118, and one or more application services (for example, JAVASCRIPT—XSJS App., Node.js, etc., JAVA App. Server, and Web Server 120a-120c, respectively) that can be called by the application router 112 as appropriate.

When a user sends an unauthenticated request to a central entry point of an application (for example, the application router 112 or another mashup service), the request is intercepted and redirected by the central security service 116 to the user account and authentication (UAA) service 106. The UAA service 106 handles can handle different types of authentication methods (for example, username/password, SAML, X.509 certificates, etc.). The UAA service 106 does not typically store user information, but relies on an external user store (not illustrated) (for example, SAP Cloud Identity, an LDAP server, the SAP HANA (or other) database, etc.

Upon successful login, in typical implementations, the UAA service 106 issues an token (for example, OAUTH or other token) that can then be forwarded in all calls from the client UI 102 to further application services (for example, 120a-120c) to authenticate a particular user. In this manner, application services 120a-120c only need to support a single authentication method (here, OAUTH or other tokens). In the described implementation, OAUTH tokens not only provide a unified authentication method but they also contain a particular user's set of permissions (or scopes). Scopes are managed in the UAA service 106 and can be derived (for example from security assertion markup language (SAML) roles or attributes). Based on scopes, applications can perform functional authorization checks on all service layers, either modeled or implemented in code. Instance-based authorization is based on attributes that may either be included in the OAUTH token or managed by the application itself.

Other authentication methods are also considered to be within the scope of this disclosure. For example, authentication at backing services (for example, databases) are based on technical users that are authenticated with username/password credentials provided to the application in its environment. The user's OAuth token may additionally be forwarded to some backing services like the HANA database for user based authorizations.

MTAs expose individual URL endpoints for each tenant that are all mapped to the same application. In typical implementations, on login, the UAA service 106 includes an identity zone as a tenant identifier in the OAUTH token to enable an application to identify a current tenant for the logged in user. On the persistence-side, MTA applications need to isolate each tenant's data. For this, the applications can either create individual backing service instances for each tenant (for example, an individual database schema per tenant) or share a common instance, managing tenant isolation within that service instance on its own (for example, a tenant ID in a discriminator column in each database table).

To support ODATA, the advanced programming model provides ODATA server libraries (for example, see application services 120a and 120b) for supported runtimes. Applications can implement their own data providers based on the ODATA server libraries, but database objects to be exposed are modeled by annotating a design-time-specified core data services (CDS) views or defining metadata artifacts and leveraging generic data providers that interpret these models. In an example, CDS is the preferred language in SAP HANA, and therefore fully supported by typical implementations of the advanced programming model. The combination of these two approaches is also possible, where the generic data providers perform the "heavy lifting" and application data providers exit to perform, for example, data validations or transformations. Consistent with the description above with regard to instance-based authorization, with the data control language (DCL) of CDS, instance based authorizations can be modeled in the advanced programming model.

With respect to the in-memory database 108, in some implementations, data interface functionality to the in-memory database 108 is provided (for example, using a data interface server 122). The data interface server 122 enables multiple clients to access and manipulate data within the in-memory database 108.

Data service brokers (not illustrated) within CLOUD FOUNDARY 118 manage in-memory database 108 backing services. A particular application that requires a certain backing service instance defines this dependency and the application platform 104 interacts with the service specific service broker to create a dedicated instance and connect the application to it.

The service broker provides various types of service instances according to a service plan that a particular application requires. Typically services are provided using deployment infrastructure containers (also interchangeably "persistence containers" or "containers") (for example, SAP HANA Deployment Infrastructure (HDI) containers), but simple database schemas are also possible. A persistence container is a special type of database schema that manages its contained database objects. These objects are described in design-time artifacts that are deployed by a deployment application (not illustrated). Persistence containers handle dependency management and determines an order of activation. They also provide some support for upgrading existing runtime artifacts when corresponding design-time artifacts are updated. The CDS annotations from which the OData interfaces are derived can be deployed to a persistence container through the deployment application when called by an MTA deployment service (see below). Likewise the above-mentioned instance authorization definitions in DCL are deployed in the same way and are the basis for authorization checks in a database.

Applications that use other persistency frameworks (for EXAMPLE, LIQUIBASE, FLYWAY, etc.) use plain schemas. These frameworks can directly execute data definition language (DDL) statements, something not permitted in persistence containers as database objects are exclusively managed by persistence containers.

Both options (persistence containers and simple database schemas) provide isolation in a shared database so that applications cannot obtain exclusive access to a complete in-memory database (for example, in-memory database 108) but only to a "container" which allows multiple applications (or different versions of one application) to share an in-memory database system.

When a particular application is started, the application platform 104 passes connection parameters and credentials of a persistence container to the application in its environment. As such, applications are not required to hard-code schema names or access global tables, but are isolated within their assigned persistence container. Multiple applications within one MTA may share a persistence container as they share the same lifecycle, but different MTAs that have different lifecycles also get different persistence container.

The above-mentioned deployment application is an application that is included with an MTA to deploy design-time artifacts to persistence containers (including CDS models). Note that language runtimes of the advanced programming model provide client libraries for easy consumption of CDS (based on the CDS) models at runtime. When an MTA is deployed, the deployment application is pushed first to prepare an in-memory database 108 persistence. By the time services are started, the persistence container is prepared and ready for use. The same pattern is also applied with other backing services in the advanced programming model. For example, an SAP Data Services smart data streaming (SDS) deployment application deploys SDS artifacts and a layered repository deployment application deploys FIORI Launchpad on Portal (FLP) content to a layered repository. Overall, the common approach is that dedicated applications initialize backing service instances for applications, coordinated by the deployment process as defined in a MTA descriptor.

In addition to the described stand-alone deployment application, persistence container functionality also offers an API that enable applications to create database objects at runtime by generating design-time artifacts within the application and to deploy the design-time artifacts using into their persistence container. This provides a way to extend persistence in runtime authoring scenarios (for example, field extensibility or dynamic rule generation).

An in-memory database instance broker (not illustrated) provides dynamic access to multiple persistence containers (that is, persistence containers or plain schemas) for applications that implement multi-tenancy data separation by tenant specific persistence containers. Whereas the in-memory database service broker provides a static binding of an application to its persistence container, the in-memory database instance broker provides an API for applications to obtain connection parameters and credentials to a tenant specific persistence container.

Typically, applications connect only to their own persistence container (or in the case of multi-tenancy—their containers), but not directly to persistence containers of other applications. In typical implementations, explicit schema references are not allowed or even possible, because they are dynamically created and managed by the in-memory database service broker. This is in-line with the decentralized data management concept in a microservices architecture. However, from a performance perspective and also from a data consistency perspective, replication is not always the best answer. Therefore, the in-memory database 108 can provide synonyms that enable a controlled breakout of an application's own persistence container and to related persistence containers. A synonym is similar to a symbolic link (from an application's perspective, the access always happens within its own persistence container, but the synonym may link to an object in another persistence container). A persistence container which exposes objects to other persistence containers, must explicitly grant access to consuming persistence containers in order to create synonyms. The exposing persistence container has control over the set of objects which can be accessed and therefore has the means to define an API on a database-level by white-listing only public objects in a database role that is granted access to the consuming persistence container. The complete setup and deployment of synonyms is typically performed by a deployment application; so, application developers do not need to perform this configuration manually.

Jobs and job steps enable one to treat complex tasks as single units. That is, several programs needed to complete a particular task can be scheduled as steps within a single job, with the advantage of the job being single logical container for all the steps needed to complete the task. Job scheduler 110 is used to define and schedule any necessary background jobs for the advanced programming model.

Figure 2:
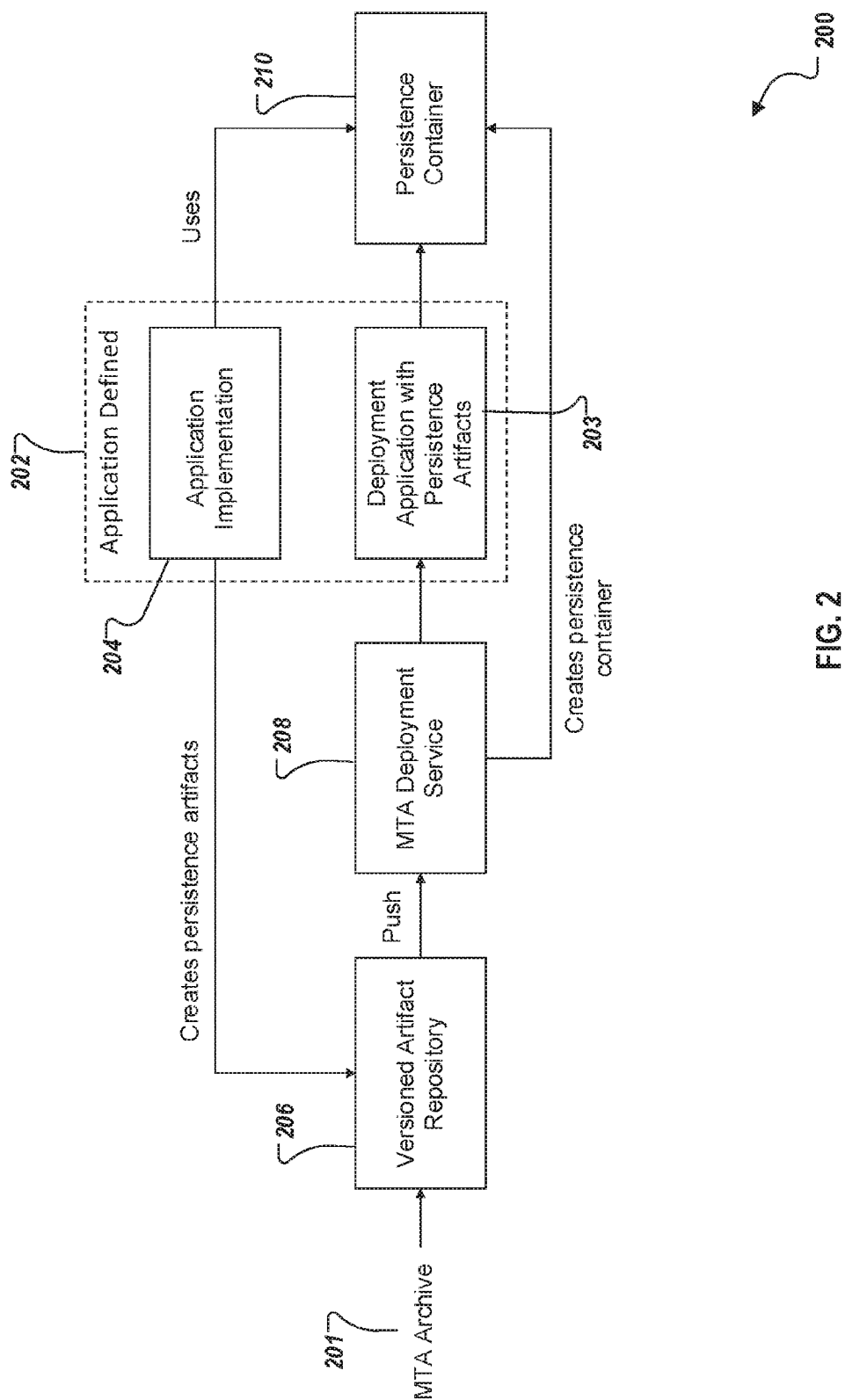
FIG. 2 is a flowchart of an example method for code/artifact management flow, according to an implementation.

FIG. 2 is a flowchart of an example method 200 for code/artifact management flow, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At a high-level, in the code/artifact management flow, a developer implements an application, models persistence artifacts as MTA deployment service content, and creates persistence artifacts as needed from within the application. On deployment, the persistence artifacts are transformed into runtime artifacts and deployed to a created persistence container. The application is started and points to the created persistence container to use the runtime artifacts.

At 202, a developer defines an application. Note that while FIG. 2 only illustrates a single application implementation and deployment application, the defined application typically includes a plurality of application implementations and deployment applications (including design-time artifacts to be deployed by the deployment applications: for example persistence artifacts to be deployed to persistence containers). From 202, method 200 proceeds to 204.

At 203, the developer models persistence artifacts as content for deployment applications. From 203, method 200 proceeds to 204.

At 204, the developer implements code that generates persistence artifacts as needed at runtime. From 204, method 200 proceeds to 206.

At 206, the generated persistence artifacts are added to an MTA associated with the defined application that can be stored in a versioned artifact repository (for example, a GIT or other repository) 206 on the development system. Note that the generated artifacts are not included in an initial MTA as they are generated at a later point in time. First, the defined application with the included modeled artifacts is added to the MTA; later, at runtime, the MTA is extended with the generated artifacts.

An MTA is a set of modules. Some modules are applications (for example, 204), while other modules are deployment applications 203 that exist to execute and deploy contained design-time artifacts to a container and creating corresponding runtime artifacts. A developer develops application modules (for example, writes code), designs design-time artifacts (for example, uses a modeling tool to create definitions of persistence objects such as tables and views and other design-time artifacts), and references a corresponding deployment application that is able to deploy specific types of created models (for example, when modeling CDS artifacts, a developer can reference an in-memory database deployment application that understands CDS persistence artifacts and knows how to generate tables and views from the persistence artifacts).

When a developer has created all application-defined content 202, including application implementations, deployment applications with their design-time artifacts, and possibly other modules, this collection of content represents an MTA that can be exported from a development system and transferred to customers to deploy to their development, test, and production systems. For transfer, an MTA is typically compressed (for example, in ZIP, RAR, TAR, etc. format) as an MTA archive 201. The MTA archive 201 typically needs to be uncompressed to individual files (as an MTA Software Package) before it is stored in a customer versioned artifact repository 206.

Note that an initial MTA is put into the versioned artifact repository 206 when deployed for the first time, but once the application is started, the application can self-modify the MTA so when the application is deployed again (for example, to a test system after an initial deployment to a development system), both transferred and runtime generated artifacts can be deployed. From 206, method 200 proceeds to 208.

At 208, a system operator (for example, a user or process) triggers an MTA deployment service to deploy an application, for example, by using a commend line interface and issuing a command to deploy an MTA from the customer versioned artifact repository 206. The trigger instructs the infrastructure (for example, CLOUD FOUNDRY or other application platform) of the advanced programming model to start the MTA deployment service. The customer versioned artifact repository 206 contains uncompressed files which are pushed to and read by the MTA deployment service. For each module in the pushed content, the MTA deployment service starts a corresponding application (for example, a deployment application or other application).

Note that the arrow left of 208, in typical implementations, is considered data flow rather than request flow, and indicates that content from the versioned artifact repository 206 is passed (pushed) to the MTA deployment service for deployment. From 208, method 200 proceeds to 210.

At 210, the MTA deployment service creates a persistence container corresponding to the module type. The started deployment application reads persistence artifacts which are bundled with the deployment application itself and transforms/creates corresponding runtime artifacts by writing the persistence artifacts to the corresponding persistence container. Once all deployment applications are completed, the MTA deployment service launches an application that uses the data in a created corresponding persistence container. After 210, method 200 stops.

Figure 4:
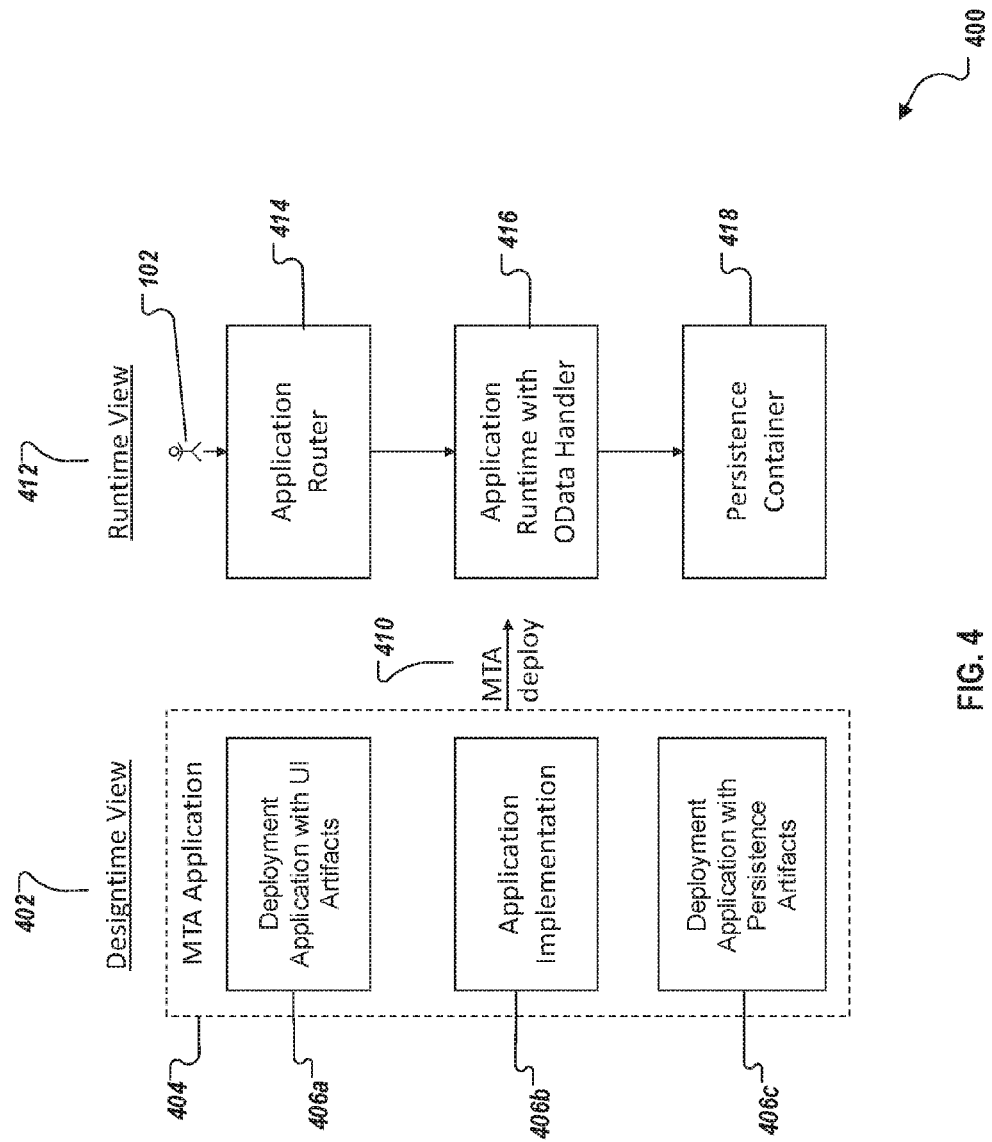
FIG. 4 is a flowchart of an example method for a data modeling/access flow, according to an implementation.

In typical implementations, design-time artifacts are models, runtime artifacts are an actual object created from the models (for example, tables, views, etc.). A "persistence artifact" is a special type of design-time artifact (short for "design-time artifact of a persistence object"). Note that there are other types of design-time artifacts (for example, SAP FIORI artifacts). FIG. 4 (below) illustrates that there can be different types of design-time artifacts and each type of design-time artifact can be deployed by different deployment applications to different containers.

Figure 3:
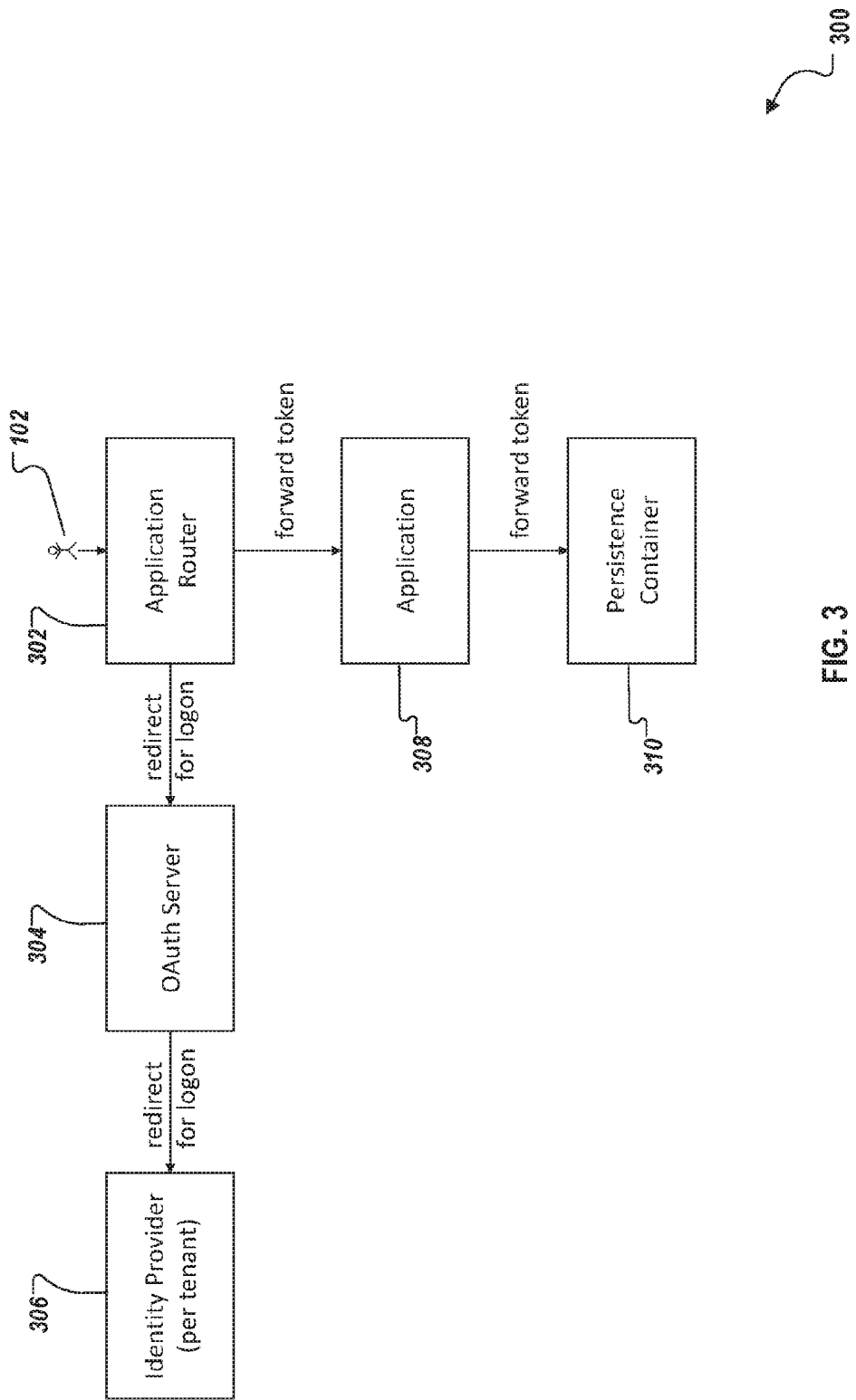
FIG. 3 is a flowchart of an example method for an authentication/authorization flow, according to an implementation.

FIG. 3 is a flowchart of an example method 300 for an authentication/authorization flow, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

In the authentication/authorization flow, at a high-level, a developer has defined scopes and associated attributes. The developer also adds scope checks on all layers as needed and models instance restrictions in the persistence container. The infrastructure authenticates a user at a tenant-specific identity provider, maps roles to scopes and attributes (as defined by an administrator), evaluates developer-modeled checks and filters, and determines a tenant-specific persistence container.

At 302, an application router receives an unauthenticated request from a client UI. The application router filters for applications based on scopes (for example, as part of a received URL pattern in the unauthenticated request). From 302, method 300 proceeds to 304.

At 304, the application router redirects (for example, using the central security service 116 of FIG. 1) the unauthenticated request to an OAUTH server (for example, the UAA service 106 of FIG. 1) which maps user roles to application scopes and attributes, adds tenant information, and returns an authentication token (a token) if the request is authenticated. From 304, method 300 proceeds to 306.

At 306, a defined per-tenant identify provider (for example, SAP Cloud Identity, an LDAP server, the SAP HANA (or other) database, etc.) authenticates the user making the unauthenticated request and returns assigned roles to the OAUTH server. A token indicating user authentication is returned to the application router from the OAUTH server and then to the client UI (for use in subsequent authentication if desired). From 306, method 300 proceeds back through 304 to 302.

Back at 302, the application router receives and forwards the token from the OAUTH server to an instance of an application. From 302, method 300 proceeds to 308.

At 308, the instance of the application receives the token and checks for scopes in coding or modeled as ODATA annotations. The application also determines the proper persistence container to access for the application instance for the authenticated user. The application instance forwards the token to the persistence container.

Note that an application can be bound to a number of persistence containers, one for each tenant of that applications. As users belong with tenants, the user determines which container with application should use for a specific user request. From 308, method 300 proceeds to 310.

At 310, the persistence container checks for scopes in coding and filters instances based on attributes (for example, as defined by DCL models). For example, instances can refer to rows in a table. An example scenario could include a database table with employees and a particular manager can only access his or her direct reports. The described instance filter would return only employees in the database table where an attribute identified the employee as a direct report of the manager. After 310, method 300 stops.

FIG. 4 is a flowchart of an example method 400 for a data modeling/access flow, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

In the data modeling/access flow, at a high-level, a developer models artifacts at design-time. The infrastructure generates runtime objects (for example, tables, views, privileges, and services), generically provisions data, enforces access restrictions, and renders UIs restricted to user authorizations.

In design-time view 402:

At 404, an MTA application is developed by a developer. The MTA application contains a deployment application 406a with UI artifacts, an application 406b, and a deployment application 406c. The deployment application with UI artifacts 406a specifies applications applicable to the MTA application 404 (for example, SAP FIORI applications) and a UI model and binding(s) to ODATA services. The application implementation 406b is logic implemented by the developer and handles data exposure generically. The deployment application with persistence artifacts 406c contains a model container persistence, annotations for UI exposure through ODATA, annotations for access restrictions (scopes), and modeled instance filters (DCL). Note that 404 illustrates the content of an example MTA with three modules. The example MTA of 404 is more detailed and of a different focus than the MTA described in FIG. 2 (the MTA in FIG. 2 only contains two modules, not three) and is provided to expand understanding of the use of an MTA with respect to the described subject matter. From 404, method 400 proceeds to MTA deployment 410.

At 410, the MTA application 404 is deployed. From 410, method 400 proceeds to runtime view 412.

In run-time view 412:

At 414, an application router passes data to an application runtime with ODATA handler. From 414, method 400 proceeds to 416.

At 416, the application runtime receives data from the application router using ODATA at 414. The application runtime reads/writes data to a persistence container. From 416, method 400 proceeds to 418.

At 418, the persistence container receives and services requests from the application runtime. This connection can, in typical implementations, be considered a database connection. For example, an OData handler can interpret the OData protocol and convert it to corresponding SQL statements. After 418, method 400 stops.

Figure 5:
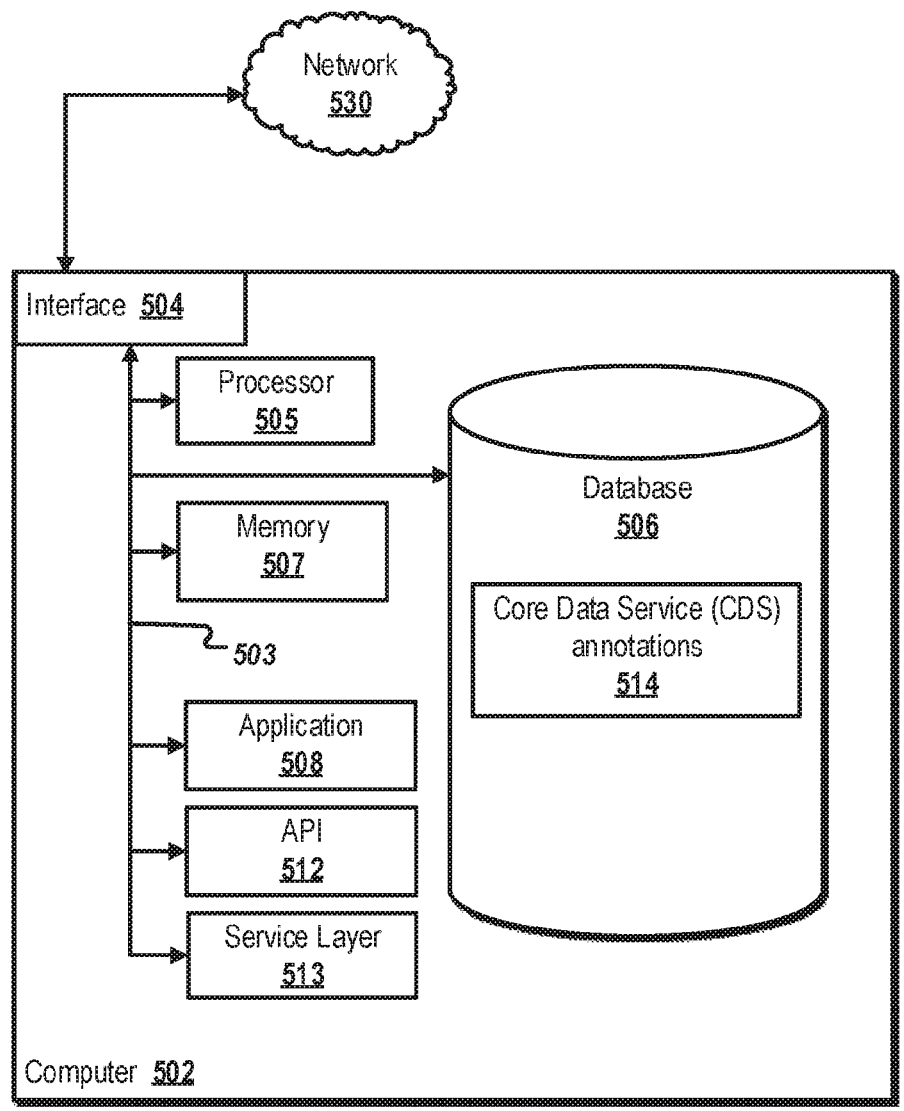
FIG. 5 is a block diagram of an exemplary computer system used to provide computational functionalities associated with described algorithms, methods, functions, processes, flows, and procedures as described in the instant disclosure, according to an implementation.

FIG. 5 is a block diagram of an exemplary computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a GUI.

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530 (whether illustrated or not). Generally, the interface 504 comprises logic encoded in software or hardware (or a combination of software and hardware) and operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502. In the illustrated computer 502, database 506 is shown to contain CDS annotations 514. The CDS annotations 514 express relationships between database tables as associations. CDS understands both, associations between entities and annotations on entities or fields of entities. In the context of OData the latter is used (fields are annotated to indicate that they should be exposed all the way from a database to a representational state transfer (REST) service). As a result, it is not necessary to JOIN database tables in SQL SELECT statements as the associations are already defined by the CDS annotations 514 at design-time. The CDS annotations 514 can be used in the database layer similarly to using an object-relational (O/R) mapper in the application layer.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, applications, etc. Further, although illustrated as a single application 508, the application 508 may be implemented as multiple applications 507 on the computer 502. In addition, although illustrated as integral to the computer 502, in alternative implementations, the application 508 can be external to the computer 502.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method, comprising: defining an application including an application implementation and a deployment application including design-time artifacts; modeling persistence artifacts as content for the deployment application; generating persistence artifacts needed at runtime using implemented software code for the application implementation and adding the generated persistence artifacts to the modeled persistence artifacts; adding the defined application to a multi-tenancy-enabled multi-target application (MTA) associated with the defined application and comprising a set of modules; storing the MTA into a versioned artifact repository; triggering an MTA deployment service to deploy the MTA; and starting the application associated with the MTA.

The foregoing and other described implementations can each optionally include one or more of the following features:

A first feature, combinable with any of the following features, wherein each module of the set of modules can be a member of the group consisting of applications and deployment applications.

A second feature, combinable with any of the previous or following features, comprising the MTA deployment service: reading the set of modules associated with the MTA; creating a persistence container corresponding to each type of a particular module of the set of modules; and starting the deployment application associated with the MTA.

A third feature, combinable with any of the previous or following features, comprising the deployment application: converting the design-time artifacts included with the deployment application into run-time artifacts; and writing the run-time artifacts into a particular persistence container corresponding to a particular module.

A fourth feature, combinable with any of the previous or following features, comprising starting the application associated with the MTA, wherein the application uses the runtime artifacts written into a corresponding persistence container.

A fifth feature, combinable with any of the previous or following features, comprising the application self-modifying the MTA by adding runtime-generated artifacts to the MTA, wherein on a subsequent deployment, the runtime-generated artifacts are deployed.

A sixth feature, combinable with any of the previous or following features, comprising extending the MTA with the generated persistence artifacts.

In a second implementation, a non-transitory, computer-readable medium storing one or more instructions executable by a computer system to perform operations comprising: defining an application including an application implementation and a deployment application including design-time artifacts; modeling persistence artifacts as content for the deployment application; generating persistence artifacts needed at runtime using implemented software code for the application implementation and adding the generated persistence artifacts to the modeled persistence artifacts; adding the defined application to a multi-tenancy-enabled multi-target application (MTA) associated with the defined application and comprising a set of modules; storing the MTA into a versioned artifact repository; triggering an MTA deployment service to deploy the MTA; and starting the application associated with the MTA.

The foregoing and other described implementations can each optionally include one or more of the following features:

A first feature, combinable with any of the following features, wherein each module of the set of modules can be a member of the group consisting of applications and deployment applications.

A second feature, combinable with any of the previous or following features, comprising one or more instructions for the MTA deployment service to: read the set of modules associated with the MTA; create a persistence container corresponding to each type of a particular module of the set of modules; and start the deployment application associated with the MTA.

A third feature, combinable with any of the previous or following features, comprising one or more instructions for the deployment application to: convert the design-time artifacts included with the deployment application into run-time artifacts; and write the run-time artifacts into a particular persistence container corresponding to a particular module.

A fourth feature, combinable with any of the previous or following features, comprising one or more instructions to start the application associated with the MTA, wherein the application uses the runtime artifacts written into a corresponding persistence container.

A fifth feature, combinable with any of the previous or following features, comprising one or more instructions for the application to self-modify the MTA by adding runtime-generated artifacts to the MTA, wherein on a subsequent deployment, the runtime-generated artifacts are deployed.

A sixth feature, combinable with any of the previous or following features, comprising one or more instructions to extend the MTA with the generated persistence artifacts.

In a third implementation, a computer-implemented system, comprising: a hardware processor interoperably coupled with a computer memory and configured to perform operations comprising: defining an application including an application implementation and a deployment application including design-time artifacts; modeling persistence artifacts as content for the deployment application; generating persistence artifacts needed at runtime using implemented software code for the application implementation and adding the generated persistence artifacts to the modeled persistence artifacts; adding the defined application to a multi-tenancy-enabled multi-target application (MTA) associated with the defined application and comprising a set of modules; storing the MTA into a versioned artifact repository; triggering an MTA deployment service to deploy the MTA; and starting the application associated with the MTA.

The foregoing and other described implementations can each optionally include one or more of the following features:

A first feature, combinable with any of the following features, wherein each module of the set of modules can be a member of the group consisting of applications and deployment applications.

A second feature, combinable with any of the previous or following features, further configured for the MTA deployment service to: read the set of modules associated with the MTA; create a persistence container corresponding to each type of a particular module of the set of modules; and start the deployment application associated with the MTA.

A third feature, combinable with any of the previous or following features, further configured for the deployment application to: convert the design-time artifacts included with the deployment application into run-time artifacts; and write the run-time artifacts into a particular persistence container corresponding to a particular module.

A fourth feature, combinable with any of the previous or following features, further configured to start the application associated with the MTA, wherein the application uses the runtime artifacts written into a corresponding persistence container; and self-modify the MTA by the application adding runtime-generated artifacts to the MTA, wherein on a subsequent deployment, the runtime-generated artifacts are deployed.

A fifth feature, combinable with any of the previous or following features, further configured to self-modify the MTA by the application adding runtime-generated artifacts to the MTA, wherein on a subsequent deployment, the runtime-generated artifacts are deployed.

A sixth feature, combinable with any of the previous or following features, further configured to extend the MTA with the generated persistence artifacts.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    defining an application comprising an application implementation and a deployment application comprising design-time artifacts describing persistence containers, the application being configured for simultaneous deployment in a multi-tenancy-enabled system and implementation in an on-premise system;
    generating modeled persistence artifacts as content for the deployment application in the multi-tenancy-enabled system;
    converting the design-time artifacts of the deployment application into runtime persistence artifacts needed at runtime using implemented software code for the application implementation in the on-premise system;
    adding the runtime persistence artifacts to the modeled persistence artifacts;
    adding the deployment application to a multi-tenancy-enabled multi-target application (MTA) associated with the application and comprising a set of modules, wherein the MTA deployment service is configured to:
        read the set of modules associated with the MTA,
        create a persistence container corresponding to each type of a particular module of the set of modules, and
        start the deployment application associated with the MTA;
    storing the MTA into a versioned artifact repository;
    triggering an MTA deployment service to deploy the MTA to the multi-tenancy-enabled system; and starting the application associated with the MTA in the on-premise system.

2. The computer-implemented method of claim 1, wherein each module of the set of modules can be a member of the group consisting of applications and deployment applications.

3. The computer-implemented method of claim 1, comprising one or more instructions for the deployment application to:
write the runtime persistence artifacts into a particular persistence container corresponding to a particular module.

4. The computer-implemented method of claim 3, comprising starting the application associated with the MTA, wherein the application uses the runtime persistence artifacts written into a corresponding persistence container.

5. The computer-implemented method of claim 4, comprising the application self-modifying the MTA by adding runtime-generated artifacts to the MTA, wherein on a subsequent deployment, the runtime-generated artifacts are deployed.

6. The computer-implemented method of claim 1, comprising extending the MTA with the runtime persistence artifacts.

7. A non-transitory, computer-readable medium storing one or more instructions executable by a computer system to perform operations comprising:
defining an application comprising an application implementation and a deployment application comprising design-time artifacts describing persistence containers, the application being configured for simultaneous deployment in a multi-tenancy-enabled system and implementation in an on-premise system;
generating modeled persistence artifacts as content for the deployment application in the multi-tenancy-enabled system;
converting the design-time artifacts of the deployment application into runtime persistence artifacts needed at runtime using implemented software code for the application implementation in the on-premise system;
adding the runtime persistence artifacts to the modeled persistence artifacts;
adding the deployment application to a multi-tenancy-enabled multi-target application (MTA) associated with the application and comprising a set of modules, wherein the MTA deployment service is configured to:
read the set of modules associated with the MTA,
create a persistence container corresponding to each type of a particular module of the set of modules, and
start the deployment application associated with the MTA;
storing the MTA into a versioned artifact repository;
triggering an MTA deployment service to deploy the MTA to the multi-tenancy-enabled system; and
starting the application associated with the MTA in the on-premise system.

8. The non-transitory, computer-readable medium of claim 7, wherein each module of the set of modules can be a member of the group consisting of applications and deployment applications.

9. The non-transitory, computer-readable medium of claim 7, comprising one or more instructions for the deployment application to:
write the runtime persistence artifacts into a particular persistence container corresponding to a particular module.

10. The non-transitory, computer-readable medium of claim 9, comprising one or more instructions to start the application associated with the MTA, wherein the application uses the runtime persistence artifacts written into a corresponding persistence container.

11. The non-transitory, computer-readable medium of claim 10, comprising one or more instructions for the application to self-modify the MTA by adding runtime-generated artifacts to the MTA, wherein on a subsequent deployment, the runtime-generated artifacts are deployed.

12. The non-transitory, computer-readable medium of claim 7, comprising one or more instructions to extend the MTA with the runtime persistence artifacts.

13. A computer-implemented system, comprising:
a hardware processor interoperably coupled with a computer memory and configured to perform operations comprising:
defining an application comprising an application implementation and a deployment application comprising design-time artifacts describing persistence containers, the application being configured for simultaneous deployment in a multi-tenancy-enabled system and implementation in an on-premise system;
generating modeled persistence artifacts as content for the deployment application in the multi-tenancy-enabled system;
converting the design-time artifacts of the deployment application into runtime persistence artifacts needed at runtime using implemented software code for the application implementation in the on-premise system;
adding the runtime persistence artifacts to the modeled persistence artifacts;
adding the deployment application to a multi-tenancy-enabled multi-target application (MTA) associated with the application and comprising a set of modules, wherein the MTA deployment service is configured to:
read the set of modules associated with the MTA,
create a persistence container corresponding to each type of a particular module of the set of modules, and
start the deployment application associated with the MTA;
storing the MTA into a versioned artifact repository;
triggering an MTA deployment service to deploy the MTA to the multi-tenancy-enabled system; and
starting the application associated with the MTA in the on-premise system.

14. The computer-implemented system of claim 13, wherein each module of the set of modules can be a member of the group consisting of applications and deployment applications.

15. The computer-implemented system of claim 13, further configured for the deployment application to:
write the run-time persistence artifacts into a particular persistence container corresponding to a particular module.

16. The computer-implemented system of claim 15, further configured to:
start the application associated with the MTA, wherein the application uses the runtime persistence artifacts written into a corresponding persistence container; and self-modify the MTA by the application adding runtime-generated artifacts to the MTA, wherein on a subsequent deployment, the runtime-generated artifacts are deployed.

17. The computer-implemented system of claim 13, further configured to extend the MTA with the runtime persistence artifacts.

* * * * *